Nov. 25, 1969    I. A. ULERT    3,480,228
SAFETY BELT AND SEAT BELT APPARATUS
Filed June 30, 1967    2 Sheets-Sheet 2
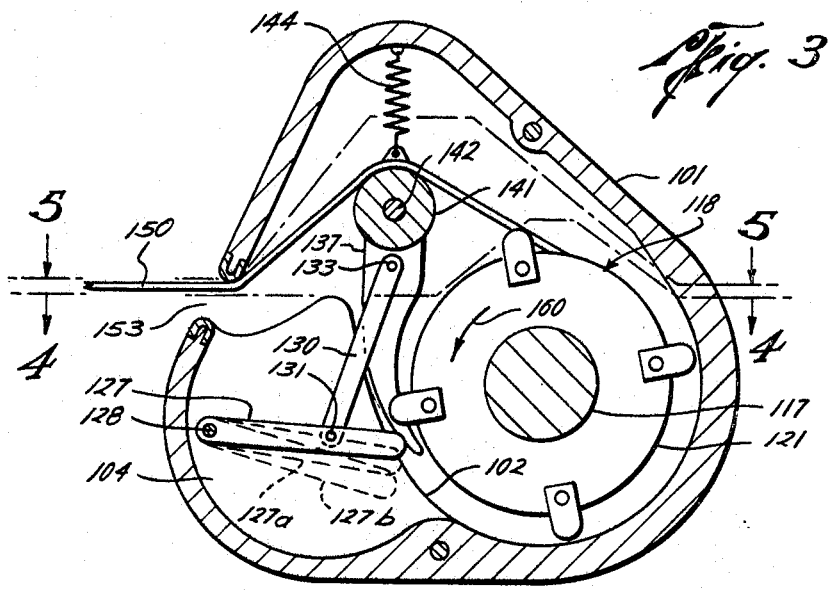
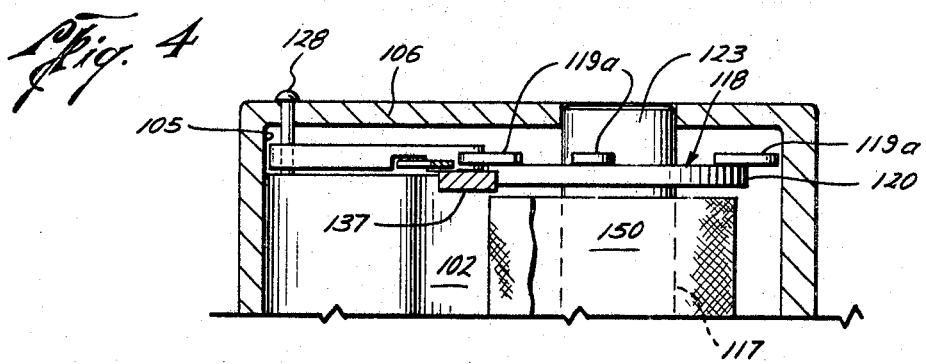
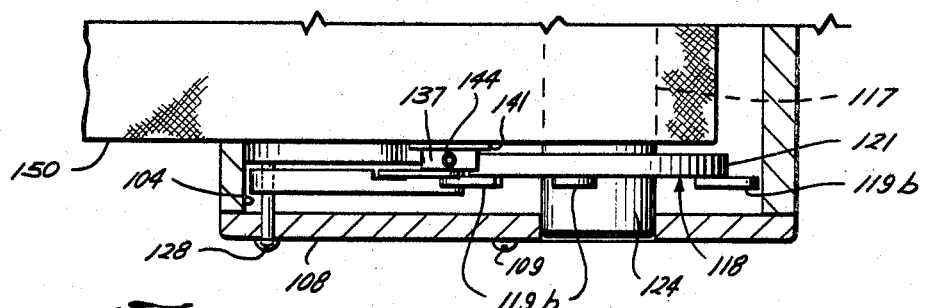
Izaak A. Ulert
INVENTOR.
BY Carl B. Fox, Jr.
ATTORNEY United States Patent Office 3,480,228
Patented Nov. 25, 1969

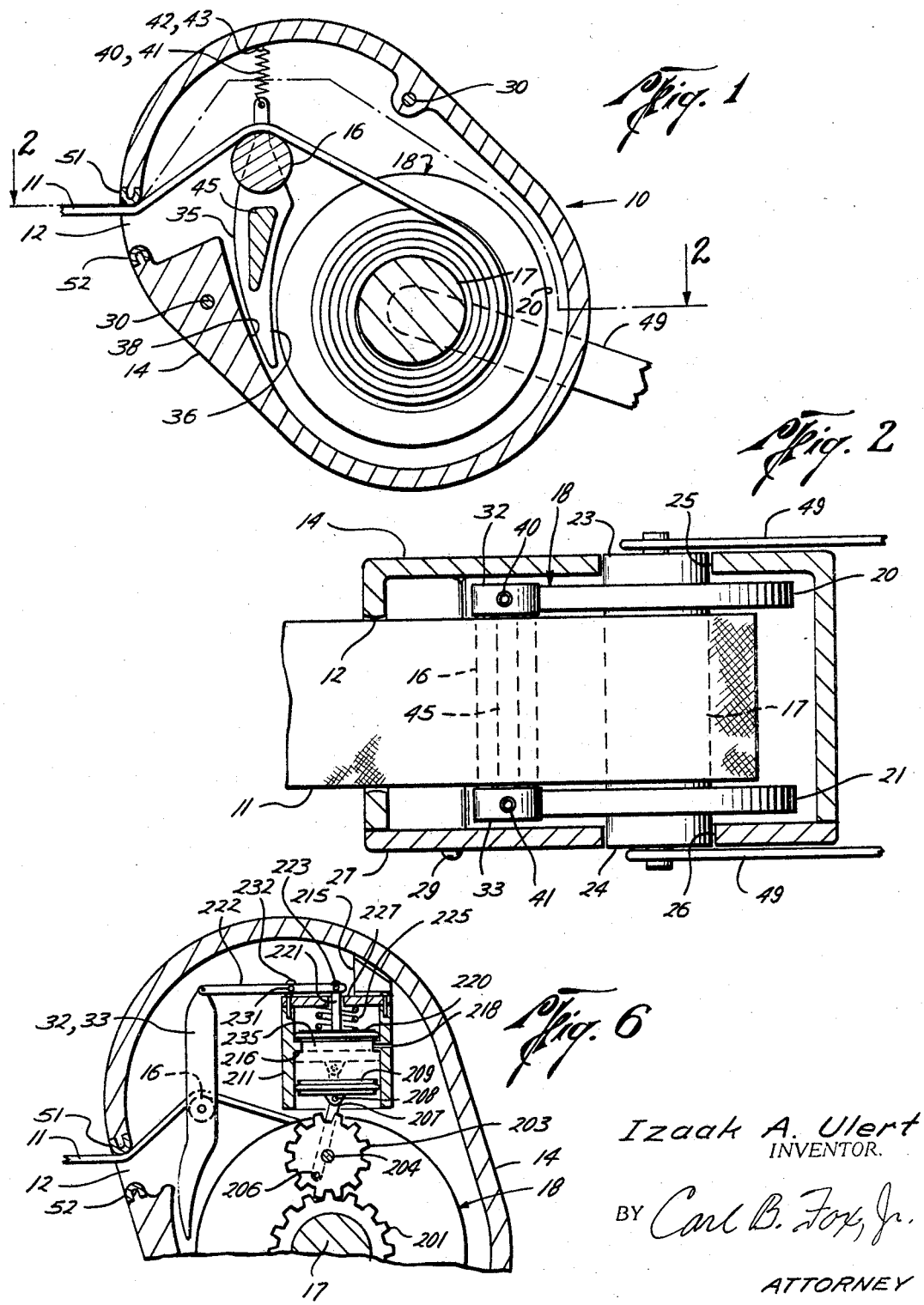

3,480,228
SAFETY BELT AND SEAT BELT APPARATUS
Izaak A. Ulert, Houston, Tex., assignor of forty-five percent to Julius Epstein, Houston, Tex., ten percent to Louis Goldfaden, Houston, Tex., and five percent to Carl B. Fox, Jr., Hedwig Village, Tex.
Filed June 30, 1967, Ser. No. 650,454
Int. Cl. B65h 75/48
U.S. Cl. 242—107.4                                          7 Claims

ABSTRACT OF THE DISCLOSURE

This application discloses safety belt and seat belt apparatus wherein the belt is wound on a spool or reel, wherein the spool is spring-biased to rewind the belt when the belt is not under tension, wherein the belt is drawn from the spool against the bias for use, and wherein the belt is withdrawable from the spool at the slower rates of belt travel to be put into use and to enable normal relatively slow movements of the person about whom the belt is placed without restraint and wherein the belt withdrawal is restrained by a brake when the belt is attempted to be withdrawn at faster rates of belt travel such as occur when a vehicle is involved in a collision or upon other sudden voluntary or involuntary movements of the person away from the point of fixture of the belt and spool apparatus.

---

The apparatus herein disclosed provides that the retractable belt is freely extendable except when extended suddenly, so that movements of a person about whom the seal belt is placed are not hindered during normal relatively slow movements, but upon sudden movement, such as that caused by sudden stopping of an automobile, or the like, the rapid extensive belt movement causes actuation of braking means which immediately prevents further extension of the belt.

BACKGROUND OF THE INVENTION

Field of the invention

The field of the invention is the field of seat and safety belt apparatus. Safety belts are used in a variety of forms, and are commonly provided in automobiles, aircraft, and other vehicular equipment. While it is important that a seat belt perform its safety function to restrain movement of a person upon impact of a vehicle, or the like, it is convenient if the belt does not overly restrain the individual in order that he may perform normal movements despite the fact that the seat belt is attached about his body. Therefore, this invention provides seat and safety belt apparatus wherein the belt may be extended to provide for the normal movements of a person, and yet, when the belt is given a jerk the brake is actuated to restrain movements.

Description of the prior art

In Patent No. 680,706 to Edmunds, entitled "Automatic Brake," there is disclosed an automatic brake which is actauted by enlargement of a roll onto which an elongate strip or web is being rolled. In Patent No. 2,071,903 to Shively, entitled "Inertia Operated Device," brake action is obtained by inertia or momentum of a ball acting against a spring, the ball under suitable conditions being thrown into a wedge space to cause braking action on a belt. In Patent No. 2,557,313 to Quilter, entitled "Safety Device for Chairs," a brake is shown which is actuated by forward or upward acceleration, by shock, or by hand. None of these prior patents discloses any apparatus wherein increased belt tension causes actuation of braking apparatus for a belt.

SUMMARY

In the subject invention, braking action for a safety belt, such as a seat belt, is achieved in response to overtensioning of the belt, which causes engagement of a brake wedge between a fixed surface and surfaces of the spool about which the belt is wound. As advantage of this type of brake action is that the brake is applied only when the individual restrained thereby moves too rapidly from his normal location. Thus, a person sitting on the seat of an automobile may make normal movements and thereby apply no undue tension to the belt. However, such person making an unduly rapid movement away from the seat, whether such movement is voluntary or involuntary, would cause action of the braking apparatus whereby his movements would be restrained by the belt. This is contrary to the teachings of the prior art, wherein acceleration or change of direction of the vehicle is the thing which causes the brake to act, and the movements of the person have no effect upon the braking action. The operative concept of the invention is that an elongate strand or web fixed at its ends, offset at a central part and longitudinally tensioned, will create a transverse force at the location of the offset which can be employed to actuate a braking mechanism.

The principal object of the invention is to provide seat belt or safety belt apparatus which can be continuously worn by an occupant of a vehicle and which will permit normal movements of the individual and yet will restrain the individual against sudden movements, such as the forward impetus given an individual when the vehicle is involved in a collision.

BRIEF DESCRIPTION OF THE DRAWINGS

FIG. 1 is an elevational view of an apparatus of preferred form according to the invention, the view being taken with the cover removed;

FIG. 2 is a cross-sectional view taken at line 2—2 of FIG. 1;

FIG. 3 is an elevational view, similar to FIG. 1, showing a modified form of apparatus according to the invention;

FIG. 4 is a cross-sectional view taken at line 4—4 of FIG. 3.

FIG. 5 is a cross-sectional view taken at line 5—5 of FIG. 3; and

FIG. 6 is a partial vertical cross-sectional view of a still further modified form of apparatus according to the invention.

DESCRIPTION OF THE PREFERRED EMBODIMENTS

Referring first to FIGS. 1–2 of the drawings, there is shown a seat belt spool or reel apparatus indicated generally by reference numeral 10. A safety or seat belt 11 passes through a slot-like opening 12 of housing or body 12 which is of oval shape as shown in FIG. 1, the belt continuing over a roller 16 and wound about the core 17 of a spool 18. The end of the belt is fixed to core 17 in any suitable manner, for example, by piercing the belt with pointed projections provided on the core (not shown). The spool 18 has radially enlarged end flanges 20, 21 at the opposite ends of core 17. Extending outside of the flanges 20, 21, the spool has axle ends 23, 24 which are engaged in openings 25, 26, respectfully, of the housing 14 and its cover 27. The cover is of the same outline form as the opposite side of the housing and is secured in place by a plurality of screws 29 received through perforations of the cover and threaded into tapped openings 30 of the housing.

The spool 18 is of the spring biased type, there being a suitable spring provided within core 17 which causes automatic rewinding of belt 11 upon the spool. In other words, when the belt is withdrawn and released, the belt will rewind upon the spool. This provides a constant relatively small longitudinal tension in the belt when it is extended in use, which maintains the belt snug about the body of a person using the belt.

Roller 16 is rotatively carried between the upper portions of two opositely disposed wedge members 32, 33. Each wedge member has shaped wedge surfaces 35, 36 at its opposite sides. Surfaces 35 are each adapted to wedge against a correspondingly shaped surface 38 provided adjacent opening 12 of housing 14. Wedge surfaces 36 are each adapted to wedge against the outer peripheral surface of one of the spool flanges 20 or 21.

Body 14 may be of cast construction, of metal or plastic, or may be formed in any of a variety of ways, including by fabrication. The external shape of body 14 is shown to more or less follow the interior of the body, but this is not necessary and the housing may be of any desired external shape, so long as the internal surfaces and other necessary components are present.

Each wedge member 32, 33 has, above the perforation therethrough in which roller 16 is mounted, a means for connecting the lower end of a helical tension spring 40, 41. The opposite end of each tension spring is connected at 42, 43, respectively, at the upper interior side of the housing. The two wedges are preferably connected by a cross member 45 for stability. The wedges and cross member may be made of unitary structure or the wedges may be secured at the opposite ends of a separate cross piece 45.

A bracket 49 is shown secured to opposite ends of spool 18, at the exterior of the housing, and this bracket may be used for connecting the seat belt reel to a vehicle, seat, or to any other desired location. The connection bracket may be made as a part of housing 14, or provided in any other suitable manner.

Anti-friction elements 51, 52 are disposed along opposite sides of opening 12, these preferably being made of nylon or Teflon, or the like, to eliminate at least a portion of the friction of the belt passing through the opening. Rollers may be provided at these points if desired in order to eliminate friction of the belt on entering and leaving the housing.

The operation of the form of apparatus shown in FIGS. 1 and 2 is as follows:

The belt end is drawn from opening 12 and secured about a person to be restrained by the belt against sudden movements. All or only a portion of the complete length of the belt may be withdrawn from reel 18. With the belt secured about a person, the person may make relatively slow to and fro movements, withdrawing and rewining the belt to some extent, and so long as the belt tension between opening 12 and the reel is not excessive, the strength of spring 40 is not overcome and roller 16 and the wedges will remain in an elevated position with respect to the surfaces 38 and the reel flange surfaces. In case of an abrupt movement of the person away from the reel apparatus, such as upon impact of the vehicle with an object, the momentum of the person will rapidly withdraw the belt 11 from the reel, this causing sufficient tension in the belt that the downward force of the belt overcomes the springs 40, 41, and results in lowering of roller 16 and the wedges. The wedges will then become firmly wedged between surfaces 38 and the flange peripheries, stopping the reel and preventing any further withdrawal of the belt. The person's movements, thus, are restrained and stopped.

Once the tension on the belt is released, the downward belt force on roller 16 is reduced and springs 40, 41 then again elevate the wedges whereby the belt is released and normal movements of the person may be resumed. Release of the wedges is assisted by the spool rotation upon rewinding of the belt onto the reel, caused by the spring within core 17, so that release of the wedges is effectively accomplished. The apparatus is then ready for a succeeding actuation of the brake by another tensioning force applied to the belt.

Referring now to FIGS. 3–5 of the drawings, the modified embodiment of the apparatus shown includes a housing 101, at the interior of which is provided a wedge seat surface 102. Slot-like reliefs 104, 105 are provided at opposite sides of seating surfaces 102, relief 105 being adjacent wall 106 of housing 101 and relief 104 being adjacent cover 108 held in place by a plurality of screws 109. The outer configuration of housing 101 corresponds generally to the interior elements. The reel 118 is almost identical with reel 18 of FIGS. 1–2, and the same description applies thereto, the reel and its elements being referred to by the same reference numerals as used in FIGS. 1–2 increased by 100. The reel 118 is modified by elongation of the axle and elements 123, 124 and by addition, at the outer surface of each spool flange 120, 121, of plural equally circularly spaced projecting lugs 119a, 119b, respectively. Within each of reliefs 104, 105, there is provided a lever or arm 127 pivotal about a pin 128 which extends therethrough into an opening in the housing body. A second arm 130 is pivotal about pin 131. Lever or arm 130 extends upwardly from lever 127 to pivotal connection at pin 133 to a side of the wedge 137 disposed for movement to engage between surface 102 and the corresponding flange 120 or 121.

Roller 141 is rotatively mounted on shaft 142 extending between the two wedges 137 located adjacent each end of each wedge and to the housing.

Seat belt or strap 150 extends from the reel over roller 141 to the opening 153. Opening 153 is fitted with an antifriction liner at its upper and lower sides as before, or other antifriction means. The lever arm 127 at each side of the housing extends to a location intersecting the circle of rotation of one set of lugs 119a, or 119b at each end of the reel. When the belt 150 is unwound from the reel, the reel rotating as the belt is unwound, the lugs contact and depress the ends of the lever arms 127 against the tension of the springs 144, with continued rotation of the reel in the direction of arrow 160. After each lug has passed the end of the lever arm, the lever arm moves upwardly under tension of spring 144 and resumes its normal upward position. This type of successive movements of the lever arms occurs so long as reel 18 is rotated at or below a certain speed, but if reel 118 is rotated at a faster speed then the lugs strike the ends of the lever arms 127 with increased force and the lever arms are moved below their normal depressed positions 127a to a further depressed position 127b. This further depression of the lever arms causes farther downward movement of wedges 127 so that the wedges engage between the surface 102 and the reel flange peripheries, whereby the brake performs its function of stopping rotation of the reel.

As in the FIGS. 1–2 embodiment, release of the pull on belt 150 releases downward force on the wedges, the clockwise rotation of the reel as shown in FIG. 3 as before assisting in release of the wedges.

Referring now to FIG. 6 of the drawings, only a portion of the apparatus being shown and the lower portions being the same as shown in FIGS. 1–2, the elements of FIG. 6 which are indicated by the same reference numerals as employed in FIGS. 1–2 are the same as the elements of FIGS. 1–2 and this previous description applies equally to FIG. 6.

At each end of the reel, only one end being shown in FIG. 6, a gear ring 201 is fixed about each axle end 23, 24 of the reel. A circular gear 203 is mounted rotatively on a shaft 204 mounted on the housing and cover at each end of the reel. Each gear 203 is connected at a pin 206 to an elongate bar 207 which is pivotally connected at a pin 208 to the lower side of piston 209. When gear 203 is rotated by rotation of the reel and gear ring 201, bar 207 causes upward and downward reciprocating movements of piston 209 in cylinder 211. A cylinder 211 is fixed at a position directly above gear 203 at each end of the reel by a bracket support 215 which is brazed or welded to the cylinder and housing at its lower and upper ends as indicated in the drawing, or which may be supported in other suitable manner.

Cylinder 211 has an interior annularly projecting shoulder 216 through which is provided a small opening 218, or bleed hole, of which more than one may be provided if desired. A second piston 220 is disposed in cylinder 211 above shoulder 216, and from which extends an upstanding bar 221 pivotally connected to crossbar 222 at pin 223. Bar 222 is pivotally connected to the upper end of one of the wedge members 32, 33, which may be identical with the wedge members of FIGS. 1–2. The wedge members, their wedging surfaces, and the reel flange and housing wedging surfaces are referred to in FIG. 6 by the same reference numerals as are used in FIGS. 1–2, and the same description applies.

The safety belt or strap 11 passes through opening 12, the sliding friction being reduced by elements 51, 52, over roller 16, and is wound on core 17 of reel or spool 18, which is of the spring-biased type to rewind the belt when no pull is acting on the other end of the belt.

A helical compression spring 225 is disposed within the upper end of cylinder 211 between removable cylinder cover 227 and piston 220, whereby piston 220 is normally (when belt 11 is not under unusual longitudinal tension) held by the spring down against shoulder 216. Each wedge 32, 33 is held in an elevated non-wedging position by bar 222, which is pivotal about pin 231 through bracket 232 depending from cover 227, and bar 221.

When belt 11 is subjected to a normal pull, such as when a person about whom the belt is connected makes normal relatively slow movements, the belt is unwound from reel 18, overcoming the spring-bias of the reel, the belt is not tensioned sufficiently between the opening 12 and the reel to cause a transverse belt force sufficient to overcome springs 225 and move the wedges to wedging positions. As the belt is unwound from or rewound onto reel 18, piston 209 is moved upwardly and downwardly, alternately decreasing and increasing the space 235 between the two pistons in the cylinder. During these movements of piston 209, air is alternately rushed into and blown out of bleed hole 218. The bleed hole (or holes) is sufficiently large that air drains out of the cylinder through the bleed hole rapidly enough that the pressure between the pistons does not increase when piston 209 is moved upwardly to a magnitude sufficient to move piston 220 upwardly, overcoming spring 225.

On the other hand, if reel 18 is caused by sudden belt tension to rotate more rapidly, to cause rapid upward-downward movements of piston 209, then bleed hole 218 being sufficiently small, on upward movement of piston 209 the pressure in space 235 is increased sufficiently that the downward force of spring 225 is overcome and piston 220 is moved upwardly by the pressure. Upward movement of each piston 22, acting through bars 221, 222, moves each wedge 32, 33 downwardly to wedging position between each surface 38 and the corresponding reel flange peripheral surface, causing a braking action on the reel to prevent further rotation of the reel and unwinding of the belt. Thus, a person about whom the belt is connected will be held restrained by the belt and protected against injury. When belt tension is released, the wedges are released and returned to non-wedging positions by springs 225 and the belt-winding rotation of the reel.

In each of the three apparatus embodiments of FIGS. 1–2, FIGS. 3–5, and FIG. 6, the respective springs 40–41, 144, and 225, are selected to perform their required functions. For example, considering the FIGS. 1–2 embodiment, if it is desired that a belt unwinding speed of 10 miles per hour (14.7 feet per second) should not be exceeded, then springs 40–41 are selected to have strengths such that they will be overcome by the transverse belt force when the belt speed reaches or exceeds 14.7 feet per second. The wedges, therefore, will be removed to their wedging positions whenever the belt is pulled from the reel at a speed of 10 miles per hour, or greater. The strengths of springs 144 are similarly selected such that impacts of lugs 119a, 119b on arms 127 cause wedging when belt travel and reel speed reach predetermined rates. The strengths of springs 225 are selected such that the upward rates of travel of pistons 209 result in lift to pistons 220 when the belt and reel are traveling and rotated in excess of a prescribed speed.

The wedges may be composed of either elastomeric or nonelastomeric material, of metal, plastic, rubber, or other material. Either or both wedging surfaces of the wedges may be roughened or treated to increase or modify their gripping characteristics, and the reel flange peripheries and housing seating surfaces may be similarly treated.

While preferred embodiments of apparatus have been shown and described, many modifications thereof may be made by a person skilled in the art without departing from the spirit of the invention.

I claim:

1. In safety belt apparatus of the type wherein the belt is wound on a flanged reel disposed within a housing and is withdrawn through an outlet from the housing for use against the belt rewinding force of a spring acting on the reel, the improvement comprising wedge means disposed within the housing adapted to releasably engage at one of its sides against the reel to restrain belt-unwinding rotation of the reel, fixed surface means within the housing engaged by another opposite side of said wedge means when said wedge means is engaged with said reel, said wedge means including antifriction surface means engaged by the belt at an angular bend in the belt between the reel and the belt outlet from the housing, said angular bend in the belt tending to straighten when the belt is tensioned, means biasing said wedge means in unset position away from engagement with said reel and surface adapted to retain said wedge means in unset condition when the belt withdrawal movement is relatively slow and the tension of the belt is relatively low and to permit movement of said wedge means to set condition engaging said reel and surface when belt withdrawal movement is relatively fast and the tension of the belt is relatively high, whereby the belt may be withdrawn from the reel against the spring bias of the reel when belt movement is slow and belt tension is not increased to set said wedge means, and whereby the belt is held against withdrawal when belt movement is fast and belt tension is increased sufficiently to set said wedge means.

2. The combination of claim 1, said wedge biasing means comprising spring means disposed between said wedge means and housing.

3. The combination of claim 2, said wedge means comprising a pair of wedges disposed at opposite ends of said reel each adapted to wedge between said housing and the periphery of one of the flange ends of the reel, said antifriction means comprising roller means rotatably disposed between said wedges, said spring means comprising a spring disposed between each wedge and the housing.

4. The combination of claim 1, said wedge biasing means comprising spring means disposed under tension between said wedge means and the housing, said apparatus including rotating lug means on said reel, lever means pivotally connected to said housing and connected to said wedge means and extending to be depressed by said lug means against the bias of said spring means upon rotation of said reel whereby said wedge means is moved toward but short of its set condition by relatively faster rotations of said reel which overdepress said lever means because of striking contact by said lug means to assist said belt tension in setting said wedge means.

5. The combination of claim 4, said lug means comprising at least one lug at each end flange of the reel, said wedge means comprising a wedge at each end of the reel adapted for wedging between the reel flange periphery and the housing, said lever means comprising a lever disposed as described in association with each said wedge, said spring means comprising a spring disposed under tension between each said wedge and the housing.

6. The combination of claim 1, said wedge biasing means including gear means rotated by rotations of the reel, first and second piston means disposed in a cylinder, means connected eccentrically of said gear means adapted to move said first piston means when said reel is rotated, said second piston being biased to move toward said first piston, means connecting said second piston means to said wedge means and adapted to move said wedge means to its said wedged condition when said second piston means is moved away from said first piston means, bleed hole means in said cylinder between said first and second piston means adapted to permit sufficient diminution of internal pressure in said cylinder when said first piston is moved toward said second piston by relatively slower rotations of said reel that the pressure does not cause movement of said second piston away from said first piston against said bias and adapted to permit sufficient increase of internal pressure in said cylinder when said first piston is moved toward said second piston by relatively faster rotations of said reel that the pressure causes movement of said second piston away from said first piston against said bias whereby said wedge means is moved to its said wedged condition.

7. The combination of claim 6, a said cylinder and first and second piston means being operatively associated as described at each end of the reel, said wedge means comprising a wedge adapted to wedge between a reel end flange periphery and the housing at each end of the reel.

References Cited

UNITED STATES PATENTS

| | | | |
|---|---|---|---|
| 3,042,339 | 7/1962 | Gschwind | 242—107.3 X |
| 3,069,107 | 12/1962 | Hirt | 242—156 X |
| 3,343,763 | 9/1967 | Sponge | 242—107.4 |

FOREIGN PATENTS 1,006,966  10/1965  Great Britain.

MERVIN STEIN, Primary Examiner

WERNER H. SCHROEDER, Assistant Examiner

U.S. Cl. X.R.

242—156